United States Patent
Andonieh et al.

(10) Patent No.: US 12,375,949 B2
(45) Date of Patent: Jul. 29, 2025

(54) SYSTEM FOR SEAMLESS RECOVERY OF DISTRIBUTED ACCESS POINTS IN A WIRELESS LOCAL AREA NETWORK

(71) Applicant: PERASO TECHNOLOGIES INC., Toronto (CA)

(72) Inventors: Jeffrey Andonieh, East Gwillimbury (CA); Hao Zhang, Mississauga (CA); Bradley Robert Lynch, Toronto (CA); James David Growden, Toronto (CA); Arie Elazar, Maple (CA); Moaz Abdulbagi Ismail Ahmed, Toronto (CA); Albert Klaas Theodoor Rietema, Guelph (CA)

(73) Assignee: PERASO TECHNOLOGIES INC., Toronto (CA)

( * ) Notice: Subject to any disclaimer, the term of this patent is extended or adjusted under 35 U.S.C. 154(b) by 425 days.

(21) Appl. No.: 17/846,275

(22) Filed: Jun. 22, 2022

(65) Prior Publication Data

US 2022/0408283 A1    Dec. 22, 2022

Related U.S. Application Data

(60) Provisional application No. 63/213,504, filed on Jun. 22, 2021.

(51) Int. Cl.
*H04W 24/04* (2009.01)
*H04W 12/037* (2021.01)
*H04W 48/12* (2009.01)
*H04W 84/12* (2009.01)

(52) U.S. Cl.
CPC ......... *H04W 24/04* (2013.01); *H04W 12/037* (2021.01); *H04W 48/12* (2013.01); *H04W 84/12* (2013.01)

(58) Field of Classification Search
CPC ..... H04W 72/02; H04W 72/20; H04W 72/25; H04L 5/0053; H04L 5/001; H04L 5/0055; H04L 5/0094
See application file for complete search history.

(56) References Cited

U.S. PATENT DOCUMENTS

| | | | | |
|---|---|---|---|---|
| 8,077,682 B2 * | 12/2011 | Zhang | .................. | H04W 12/06 709/227 |
| 2021/0274582 A1 * | 9/2021 | Venkatachalam | ..... | H04W 24/04 |
| 2022/0322467 A1 * | 10/2022 | Madan | .................. | H04W 76/14 |

* cited by examiner

*Primary Examiner* — Jamal Javaid
(74) *Attorney, Agent, or Firm* — Perry + Currier Inc.

(57) ABSTRACT

A computing system for recovery of lost access points in a distributed wireless local area network, including: (a) a host controller, (b) a plurality of access point, and (c) a plurality of stations. When setting up the network, the host controller is configured to register the plurality of access points, instruct the access points to send beacons to the plurality of stations, and perform a handshake to generate a unique encryption key for each of the plurality of stations. When the host controller detects that a physical access point has been lost and then recovered, it can optionally perform a handshake to generate a new encryption key and transmit this new encryption key to the other access points in the network before data communication commences to any of the stations through the recovered physical access point.

18 Claims, 4 Drawing Sheets

SYSTEM FOR SEAMLESS RECOVERY OF DISTRIBUTED ACCESS POINTS IN A WIRELESS LOCAL AREA NETWORK

RELATED APPLICATION

The present application claims priority to U.S. provisional patent application Ser. No. 63/213,504, entitled DISTRIBUTED AP MAC SEAMLESS RECOVERY, filed Jun. 22, 2021, the entire disclosure of which is incorporated herein by reference in its entirety.

TECHNICAL FIELD

The present system relates in general to wireless communication systems, and in particular to wireless local area networks having multiple access points.

BACKGROUND OF THE INVENTION

Wireless local area networks (WLANs) such as those based on the 802.11 family of standards typically have multiple access points to provide coverage over a larger area than can be achieved with a single access point. Unfortunately, individual access points can drop from the network and re-connect to the network at different times. This may occur for a variety of reasons, including but not limited to: loss of communication to the host where the physical access point resides, loss of one or more agents/drivers in the system, the loss of the device in which the physical access point resides, various timeouts and resets triggered by the host controller, or the host controller evicting the physical access point from the network for various reasons.

Such lost access point interruptions can be problematic and may require that the entire network be brought down and then re-started such that the lost access points can be re-included in the network.

SUMMARY OF THE INVENTION

The invention provides for substantially seamless re-admitting of lost access points back into the network after these lost access points have regained their functionality. Ideally, such a seamless recovery system would function without having to bring down and re-start the entire network. Ideally as well, such a recovery system would ensure that proper security protocols were met when re-admitting lost access points to the network.

As will be shown herein, the present system permits seamless and secure recovery of lost physical access points to a wireless local area network such that the lost access points can be securely re-admitted to the network without interrupting the operation of the network.

In some aspects, the present disclosure provides a computing system for recovery of lost access points in a distributed wireless local area network, comprising a host controller, a plurality of access points; and a plurality of stations. In preferred aspects, the host controller is configured to: register the plurality of access points, instruct the plurality of access points to send beacons to the plurality of stations, perform a handshake with each of the plurality of access points to generate a unique encryption key for each of the plurality of access points, and to detect that communication to a recovered physical access point has been lost and then recovered. The host controller stores unique identifiers of each of the access points and a master identifier of the host controller. The host controller instructs the access points to transmit the identifiers to the stations. Each of the plurality of access points are preferably configured to receive association requests from the stations, and to send association responses back to the stations.

In some aspects, the host controller comprises: (a) a communications interface for communicating with each of the access points, (b) memory storing the unique identifiers of each of the access points, and a master identifier of the host controller, and (c) a processor configured to: instruct each of the access points to send beacons to the stations, detect a loss and recovery of any of the access points, and to perform a handshake with each of the access points to generate an encryption key for each of the access points.

A first example advantage of the present system is that lost access points can be seamlessly re-admitted to the network without having to interrupt operation of the network.

A second example advantage of the present system is that the lost access points can be seamlessly re-admitted to the network is a manner that meets accepted 802.11 standards and does not compromise network security.

As stated above, the access points transmit beacons to the plurality of stations. Preferably, each of the beacons comprise basic service set identifiers (BSSIDs) that are unique to the individual access points and are distinct from a BSSID for the host controller such that the stations can identify each of the individual access points. Preferably as well, the unique BSSIDs for each access point includes media access control (MAC) data.

In further aspects, the present disclosure also provides a method of seamlessly recovering a lost access point in a distributed wireless local area network, comprising: (a) registering a plurality of access points to a host controller; (b) transmitting beacons from a plurality of access points to a plurality of stations after each of the access points have been instructed by the host controller to transmit the beacons; (c) associating the plurality of access points to the plurality of stations; (d) performing a handshake between the host controller and each access point to generate a first encryption key for each of the access points to permit data traffic between each of the access points and the plurality of stations; (e) having the host controller detect that communication to a recovered physical access point has been lost and then recovered; (f) having the host controller signal the recovered physical access point to transmit a beacon to the plurality of stations; (g) associating the recovered physical access point to the plurality of stations; (h) performing a handshake between the host controller and one of the non-lost and recovered access points to generate a new encryption key to permit data traffic between the recovered physical access point and the plurality of stations; and then (i) transmitting the new encryption key for the recovered physical access point to the plurality of access points. Alternatively, the host controller may simply re-distribute an old encryption key to the recovered access point should it be determined by the host controller that it is not necessary to generate new system encryption keys.

The above method offers the advantage of data security, as follows. Each time a physical access point is lost and later recovered, a handshake is performed to generate a new encryption key for the recovered physical access point. This new encryption key is then sent to the other access points in the network before any data transmission through the recovered access point to any of the stations in the network can commence. As such, a recovered access point cannot become a "hole" in the security of the present network. Instead, the security of the lost and recovered access point is validated prior to it actually re-joining the network.

DETAILED DESCRIPTION OF THE DRAWINGS

Figure 1:
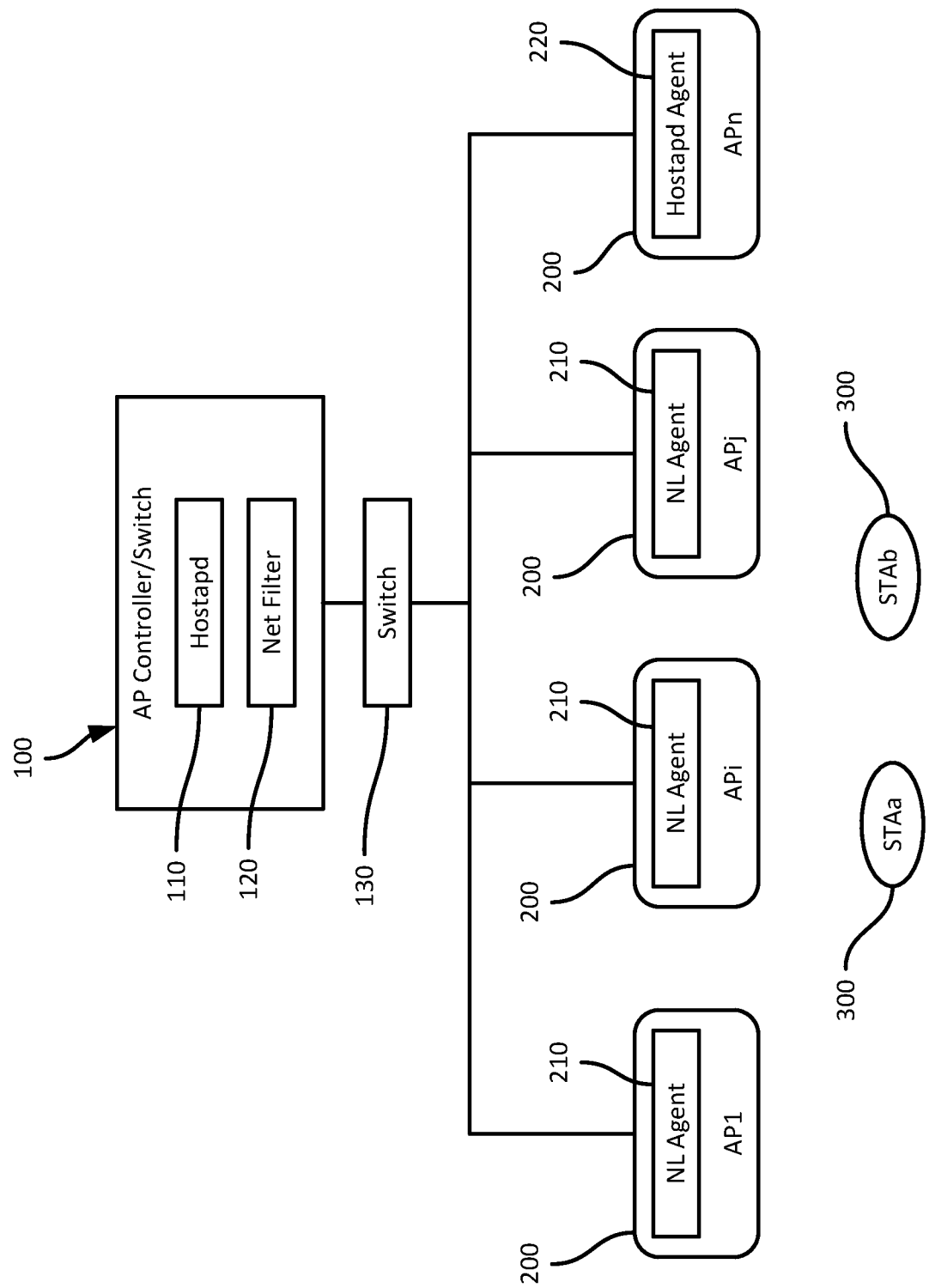
FIG. 1 is an illustration of various components of the present system.

FIG. 1 is a simplified illustration of the various components of the present system, including a host controller 100, a plurality of access points 200 and a plurality of stations 300 in a distributed wireless area network such as a WiFi network based on one of the 802.11 family of standards. In preferred aspects, each access point 200 can be a router or other device capable of acting as an access point to the network.

In preferred aspects, host controller 100 comprises a host access point daemon Hostapd 110, and a net filter 120. Hostapd 110 preferably operates to detect the loss and recovery of the access points 200, and control the reentry of the access points 200 into the present network. Host controller 100 preferably includes a communication interface, a processor and a non-transitory computer readable storage memory having stored thereon various computer readable instructions for performing various actions. Net Filter 120 operates to remove duplicates of traffic coming though the plurality of the access points. Switch 130 is provided to send control instructions and data to the plurality of access points.

Each access point 200 (labeled as "AP1" to "APn") preferably includes an NL Agent 210 for communicating with Hostapd 110. At least one access point, e.g., APn, preferably includes an Hostapd Agent 220 for communicating with Hostapd 110. Hostapd Agent 220 operates the same as NL Agent 210 except that the hostapd agent 220 includes other communication memory together with the NL agent.

Figure 2:
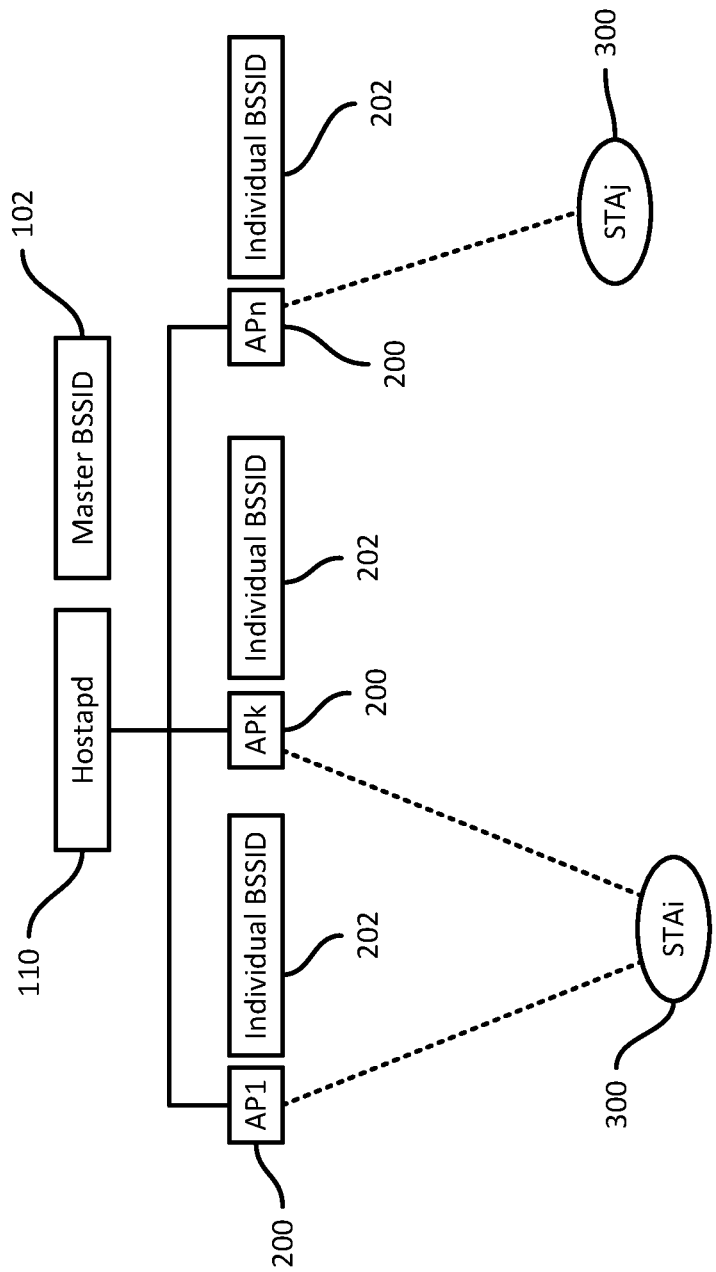
FIG. 2 is a second illustration of various components of the present system showing further details of the communication pathways within the system.

FIG. 2 is a simplified illustration of communication pathways between Hostapd 110, access points 200, and stations 300. Specifically, Hostapd 110 is configured to communicate directly with each of the access points 200, as shown. In this particular illustrated configuration, station STAi is communicating through access points AP1 and APk while station STAj is communicating with access point APn. As will be explained below, different stations 300 will communicate through different access points 200, and each of stations 300 will preferably select the access point 200 through which they wish to communicate.

As seen in FIG. 2, each access point 200 will preferably have its own dedicated BSSID 202, and Hostapd 110 will preferably have its own dedicated Master BSSID 102.

Figure 3:
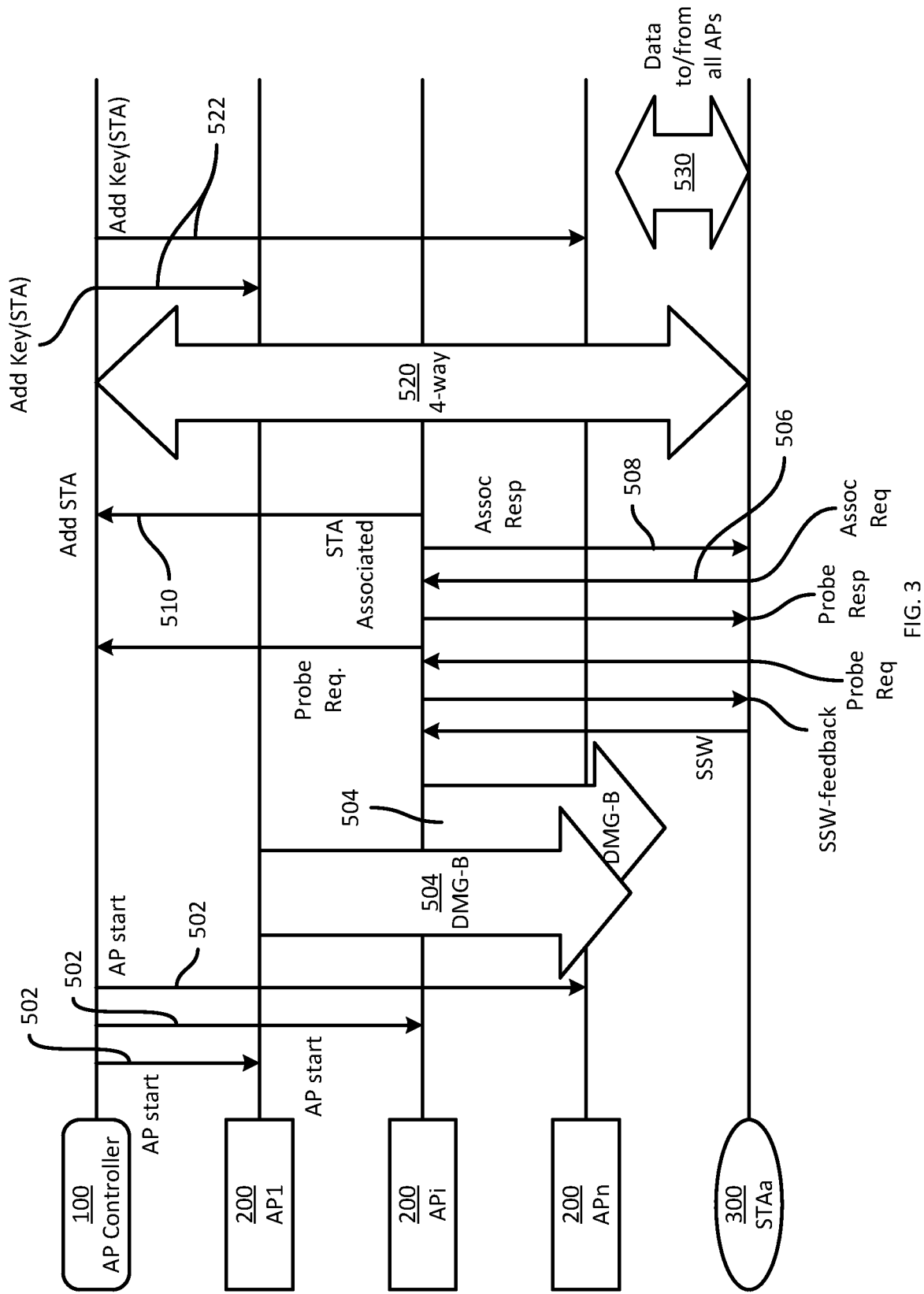
FIG. 3 is a flowchart of normal system operation as various access points are added to the system (prior to the loss and recovery of any of the access points).

FIG. 3 is a flowchart of normal system operation as various access points 200 are added to the system (prior to the loss and recovery of any of the access points 200). As such, FIG. 3 represents the normal flow of operation in initially setting up the present network, as follows.

First, at step 502, each of access points 200 (AP1 to APn) starts operation and is registered to host controller 100. At this time, host controller 100 instructs each of access points 200 to send beacons to the various stations 300 (represented as STA 300 in FIGS. 1 and 2). The beacons are then sent at step 504. Preferably, initially registering a plurality of access points 200 to host controller 100 comprises: a host driver agent (210 or 220 in FIG. 1) in each access point 200 contacting a host driver 110 in host controller 100, thereby identifying the access point 200 to the host controller 100, and the host controller 100 maintaining a list of the identities of each of the access points 200.

Next, when stations 300 have received the beacons from the various access points 200, each of the stations will select its preferred or desired access point. For example, assume that station 300 selects preferred access point APi. Station 300 will then, at step 506, send an association request to access point APi. Access point APi will then respond to station 300 with an association response at step 508. Accordingly, at step 510, the access point APi (selected for association by the station 300 "STAa" in this example) indicates its association with the station 300 to the host controller 100. This process may repeat across the network for other stations 300, which can select and associate with access points 200 and as such, the various access points 200 in the network will become associated with the various stations 300 across the network.

After the association of the various access points 200 to the various stations 300 in the network, the host controller 100 will then ensure system security by performing a 4-way (or 8-way or other) handshake (at step 520) between host controller 100 and each of the selected access points 200. This handshake will generate a unique encryption key for each of the access points 200. Each access point 200's unique encryption key will permit data traffic through that access point 200 to the station(s) 300. Specifically, the encryption keys are sent to the various stations at step 522 such that data can then begin to pass to and from the various access points 200 and the stations 300 at step 530.

In preferred aspects, the encryption key may simply include a 48 bit sequence number identifying the network appended to a number identifying the particular unique access point 200. In preferred aspects, the upper bits of the key can act as an identifier of the access point with a few bits of the key being carved out to support indexing of the access point. The exact key size used (e.g., 48 bit or more) may depend upon the actual hardware support. The station 300 will be able to decrypt the data coming from any access point 200 using same key and a mask of the index. This can be accomplished by storing the individual access point key that has been generated with the index of the access point at the A2 part of the index key with the PN portion of the key being identical to all access points.

However, if there is a security risk and the various access points 200 cannot share the same 48 bit sequence number identifying the network, then each access point 200 could generate its own unique 48 bit sequence number for inclusion into the encryption key. Various methods could be used to generate each access point's own unique 48 bit sequence number. It is to be understood that the present system is not limited to any particular method or system of encryption key generation. Moreover, in those instances where security of the network is not a concern, the step of generating encryption keys prior to permitting communication through recovered access points 200 can be omitted.

Figure 4:
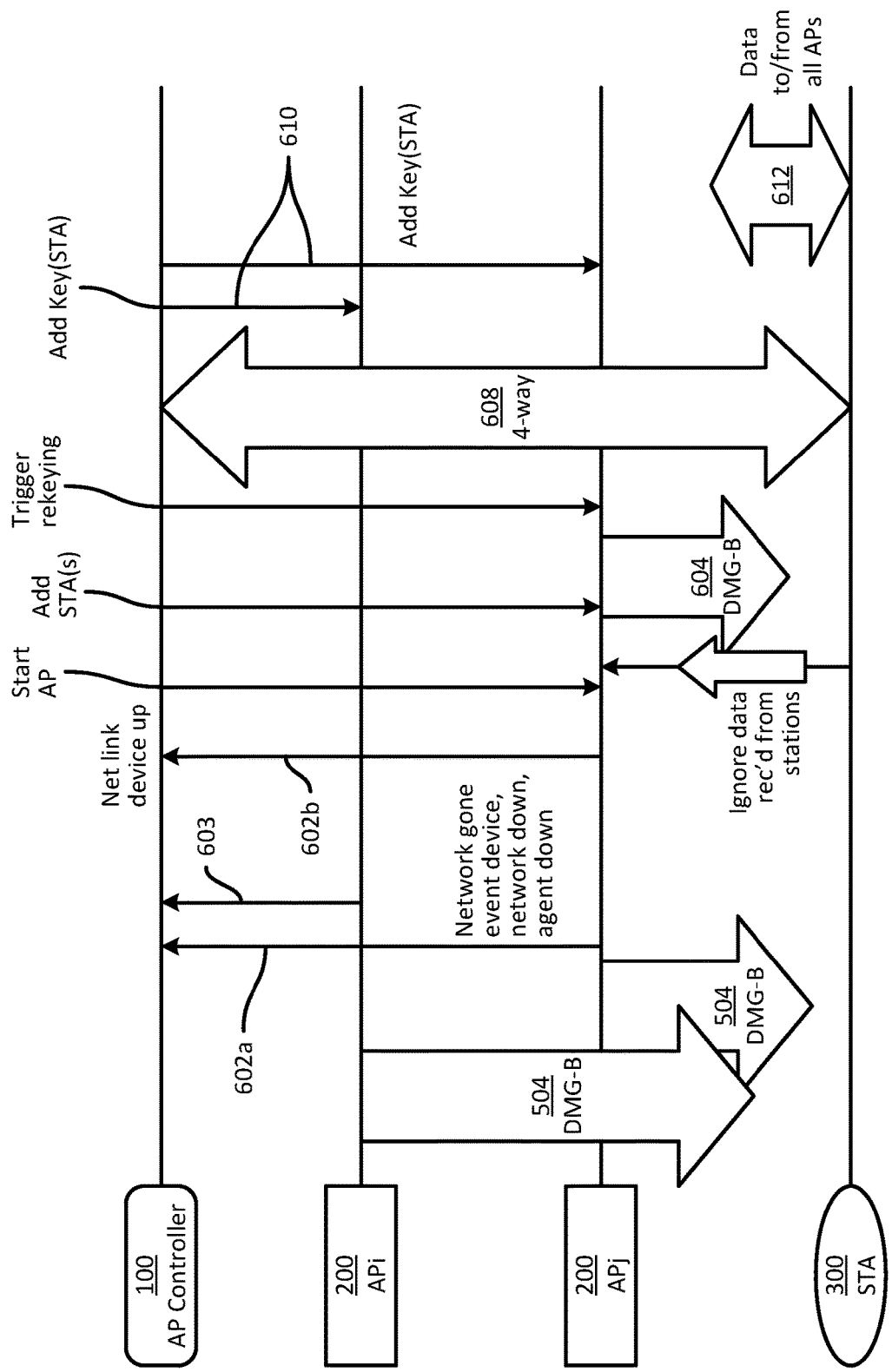
FIG. 4 is a flowchart of system operation following the loss and recovery of one of the access points.

FIG. 4 represents what happens when one of the access points 200 becomes lost and is then recovered. Such loss of an access point 200 can be attributed to many different causes, including, but not limited to: loss of communication to the host 100 where the physical access point resides, loss of one or more agents/drivers in the system, the loss of the device in which the physical access point resides, various timeouts and resets triggered by the host controller 100 itself, or the host controller 100 simply evicting the particular physical access point from the network for some other reason.

First, host controller 100 detects the loss and recovery of one of the physical access points 200. As set forth above, prior to the access point(s) 200 being lost, the various access points 200 will each be transmitting beacons to the stations at step 504. Next, at step 602, host controller 100 will detect the loss and recovery of one or more physical access point(s) 200 (the access point APj, in the illustrated example). In particular, the host controller 100 may detect the loss of the access point "APj" at step 602a, and the restart of that access point at step 602b. The host controller 100 may also detect, e.g., at step 603, new associations between stations 300 and remaining access points 200 (e.g., the access point "APi"), as the stations 300 previously associated with the lost access point 200 reconnect with other access points 200. At this time, the memory of the lost and recovered access point may be wiped clean (e.g., the access point "APj" may no longer store encryption keys or station 300 associations).

At this time, host controller 100 will then send instructions ("Start AP" in FIG. 4) to the recovered access point 200 telling the access point to (once again) transmit a beacon to the station, at step 604. Simply put, the host controller 100 tells the recovered access point 200 what its identity is (due to the access point's memory being lost) and its transmitted beacon then announces to the various stations 300 that this recovered access point is now back online. The host controller 100 may also send station association data ("Add STA(s)" in FIG. 4) to the recovered access point 200. The station association data can include the identities of any stations 300 that were associated with the access point 200 prior to disruption of the operation of that access point 200. As such, the recovered access point 200 can be associated to a preferred station (as determined by the station itself sending an association request as was explained above). Until the above instructions, and in some examples the restored station associations, are received at the recovered access point 200, that access point 200 may ignore any data received from the stations 300.

The various stations 300 can then choose to start communicating with the recovered access point 200 after encryption keys for the stations have been recovered or reestablished and installed on the recovered physical access point. Should a new encryption key be desired, at step 608, host controller 100 can perform a handshake between the host controller and one of the non-lost and recovered physical access points to generate new encryption keys for every station. This new encryption key will then permit data traffic between the recovered physical access point and the plurality of stations after the new encryption key has been transmitted to the plurality of other access points 200 at step 610 (where the various stations are added back to the network). Once the new encryption key has been generated, then both the station 300 and the access point 200 start using the new encryption key. Finally, at step 612, secure data can then begin to pass to and from the various access points 200 and the stations 300, thereby returning the network to normal operation.

To perform the above method, host controller 100 preferably comprises: a communications interface for communicating with each of the access points 200, a memory storing: (a) unique identifiers of each of the access points, and (b) a master identifier of the host controller, and a processor configured to: (a) instruct each of the access points to send beacons to the stations, detect a loss and recovery of any of the access points, and to perform a handshake with each of the access points to generate an encryption key for each of the access points.

In preferred aspects, the association responses sent (at step 508 in FIG. 3) from the access points 200 to the stations 300 comprise a tracking list of each of the plurality of access points. The non-lost and recovered access point that has been designated to do the key exchange will also send an association response. This tracking list can preferably be maintained both in the host controller 100 and the physical access point 200 itself. Preferably, the tracking list corresponds to the desired access point 200 selected by a particular station 300.

In preferred aspects, the beacons sent at step 504 comprise basic service set identifiers (BSSIDs) that are unique to the individual access points 200 and are distinct from a Master BSSID for the host controller such that the various stations 300 can identify each of the individual access points 200. Most preferably, the unique BSSIDs for each access point includes media access control (MAC) data, and the host controller 100 instructs each of the access points 200 to transmit beacons to the stations 300 by sending instructions to each of the access points 200's local media access control (MAC) address.

In other preferred aspects, the present computing system for recovery of lost access points in a distributed wireless local area network thus comprises: (a) a host controller, (b) a plurality of access points; and (c) a plurality of stations, wherein the host controller is configured to: (i) register the plurality of access points, (ii) instruct the plurality of access points to send beacons to the plurality of stations, (iii) perform a handshake with each of the plurality of access points to generate a unique encryption key for each of the plurality of access points, (iv) detect that communication to a recovered physical access point has been lost and then recovered, and wherein each of the plurality of access points are configured to: (i) receive association requests from the stations, and (ii) sent association responses to the stations.

In preferred aspects, each access point 200 has its address decided by the host controller 100, and the host controller 100 will preferably send a vendor-specific command to each AP driver agent 210 or 220, which will in turn send the command to its MAC layer driver. The generated encryption keys are added to the MAC layer and the various stations 300 know which encryption key belongs to which access point 200. In preferred aspects, the BSSID identifiers can comprise a numerical chain having prefixes and suffixes. As such, the whole AP MAC address may be shared to the stations 300, or an addressing scheme may be used so the station can figure out the individual AP's MAC addresses—for example, a prefix can be identical over all access points 200 and a suffix may be a unique identifier for each individual access point 200.

Also in preferred aspects, the tracking lists sent by the host controller 100 to each of the access points 200 can be the same or different tracking lists can be sent to different access points 200. Each station 300 can then receive the tracking list of the access point that it chose to be associated with. When an access point is lost, the tracking list can be updated to allow for beam forming and training (until the access point is again recovered).

The scope of the claims should not be limited by the embodiments set forth in the above examples, but should be given the broadest interpretation consistent with the description as a whole.

What is claimed is:

1. A method of seamlessly recovering a lost access point in a distributed wireless local area network, comprising:
   (a) registering a plurality of access points to a host controller;
   (b) transmitting beacons from a plurality of access points to a plurality of stations after each of the access points have been instructed by the host controller to transmit the beacons;
   (c) associating the plurality of access points to the plurality of stations;
   (d) performing a handshake between the host controller and at least one access point to generate a first encryption key for each of the stations to permit data traffic between each of the access points and the plurality of stations;
   (e) having the host controller detect that communication to a recovered physical access point has been lost and then recovered;
   (f) having the host controller signal the recovered physical access point to transmit a beacon to the plurality of stations;
   (g) seamlessly associating the plurality of stations to the recovered physical access point;
   (h) performing a handshake between the host controller and one of the non-lost and recovered physical access points to generate new encryption keys to permit data traffic between the recovered physical access point and the plurality of stations; and then
   (i) transmitting the new encryption key for the recovered physical access point to the plurality of access points.

2. The method of claim 1, wherein associating the plurality of access points to the plurality of stations comprises:
   Prior to the loss and recovery of the physical access point, having each station send an association request to a desired access point, and then
   having the desired access point send an association response back to the station, such that each station selects at least one preferred access point.

3. The method of claim 2, wherein the association response comprises a tracking list of each of the plurality of access points, wherein the tracking list is maintained both in the host controller and the physical access point, and wherein the tracking list corresponds to the desired access point selected by the station.

4. The method of claim 1, wherein the host controller comprises:
   a communications interface for communicating with each of the access points,
   memory storing:
      unique identifiers of each of the access points, and
      a master identifier of the host controller, and
   a processor configured to:
      instruct each of the access points to send beacons to the stations,
      detect a loss and recovery of any of the access points,
      perform a handshake with each of the access points to generate an encryption key for each of the access points.

5. The method of claim 1, wherein registering a plurality of access points to a host controller comprises:
   a host driver agent in each access point contacting a host driver in the host controller, thereby identifying the access point to the host controller, and
   the host controller maintaining a list of the identities of each of the access points.

6. The method of claim 1, wherein each of the beacons comprise basic service set identifiers (BSSIDs) that are unique to the individual access points and are distinct from a BSSID for the host controller such that the stations can identify each of the individual access points.

7. The method of claim 6, wherein the unique BSSIDs for each access point includes media access control (MAC) data.

8. The method of claim 1, wherein the host controller instructs each of the access points to transmit beacons by sending instructions to each access points local media access control (MAC) address.

9. The method of claim 1, wherein the identity and new encryption key of the recovered physical access point is transmitted from the host controller to all the other access points.

10. A computing device for recovery of lost access points in a distributed wireless local area network, comprising:
    (a) a host controller, comprising:
       (i) a communication interface for communicating with a plurality of access points,
       (ii) memory storing:
          unique identifiers of each of a plurality of access points, and
          a master identifier of the host controller, and
       (iii) a processor configured to:
          register each of the plurality of access points,
          instruct each of the plurality of access points to transmit beacons to a plurality of stations, and
          perform a handshake with each of the plurality of access points to generate a unique encryption key for each of the plurality of access points,
          detect that communication to a recovered physical access point has been lost and then recovered; and
          perform a second handshake to generate a second unique encryption key with any physical access point that has been lost and recovered.

11. The device of claim 10, wherein the host controller is configured to transmit both:
    the unique encryption key for each of the plurality of access points, and
    the second unique encryption key for any physical access point that has been lost and recovered,
    to each of the plurality of access points.

12. The device of claim 11, wherein the unique encryption keys are basic service set identifiers (BSSIDs) that include media access control (MAC) data.

13. A computing system for recovery of lost access points in a distributed wireless local area network, comprising:
    (a) a host controller,
    (b) a plurality of access points; and
    (c) a plurality of stations,
    wherein the host controller is configured to:
       register the plurality of access points,
       instruct the plurality of access points to send beacons to the plurality of stations,
       perform a handshake with each of the plurality of access points to generate a unique encryption key for each of the plurality of access points,
       detect that communication to a recovered physical access point has been lost and then recovered, and
    wherein each of the plurality of access points are configured to:
       receive association requests from the stations, and
       send association responses to the stations, the association responses comprising a tracking list of each of the plurality of access points, wherein the tracking list is maintained in the host controller.

14. The system of claim 13, wherein the host controller is configured to store:
   unique identifiers of each of the access points, and
   a master identifier of the host controller, and
   to instruct the access points to transmit the identifiers to the stations.

15. The system of claim 13, wherein each of the beacons comprise basic service set identifiers (BSSIDs) that are unique to the individual access points and are distinct from a BSSID for the host controller such that the stations can identify each of the individual access points.

16. The system of claim 15, wherein the unique BSSIDs for each access point includes media access control (MAC) data.

17. The system of claim 13, wherein the host controller instructs each of the access points to transmit beacons by sending instructions to each access points local media access control (MAC) address.

18. The system of claim 13, wherein the host controller is configured to transmit the identity and new encryption key of the recovered physical access point is transmitted from the host controller to all the other access points.

* * * * *